No. 623,070. Patented Apr. 11, 1899.
W. P. BONWICK.
BOTTLE STOPPER.
(Application filed June 12, 1897.)
(No Model.)
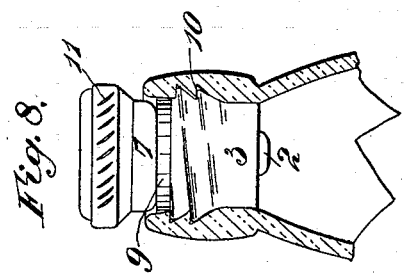
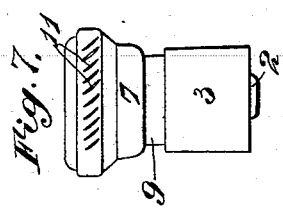
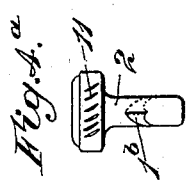
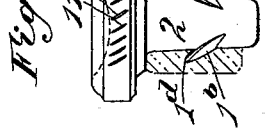
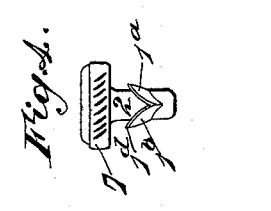
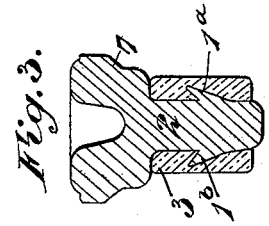
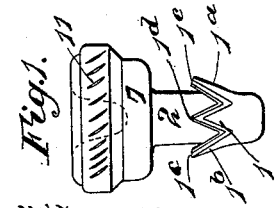
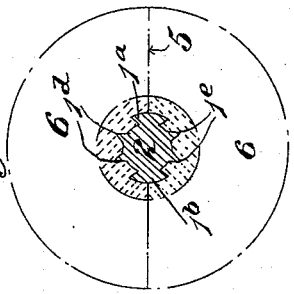
Witnesses
Geo. E. Frech
Hubert E. Peck
Inventor.
W. P. Bonwick,
per Pattison Nesbit
Attys

UNITED STATES PATENT OFFICE.

WILLIAM PRIESSNITZ BONWICK, OF LONDON, ENGLAND, ASSIGNOR TO THE PATENT "BARB" BOTTLE STOPPER SYNDICATE, LIMITED, OF SAME PLACE.

BOTTLE-STOPPER.

SPECIFICATION forming part of Letters Patent No. 623,070, dated April 11, 1899.

Application filed June 12, 1897. Serial No. 640,529. (No model.)

*To all whom it may concern:*

Be it known that I, WILLIAM PRIESSNITZ BONWICK, a subject of the Queen of Great Britain and Ireland, residing at London, England, have invented Improvements in Bottle-Stoppers, of which the following is a specification, and for which patents have been granted in Great Britain, No. 15,520, dated August 17, 1895, and in France, No. 259,763, dated September 10, 1896.

Bottle-stoppers have been made with a central body or stem of vitreous material, such as glass, surrounded with a cork facing, to prevent turning or endwise removal of which facing the body or stem has been formed with teeth, screw-threads, or projections of other forms taking into the cork and annular ridges or beads engaging with the ends of the cork. In practice, however, it has been found that teeth are liable to break off, that protruding ridges or beads, besides being unsightly, render glass stems liable to fracture when cooling, and that stoppers having screw-threads on the stems are liable to turn in their cork facings and sometimes to leave their cork facing in the bottle-neck.

Now my present invention has reference to a novel and cheap construction of stopper designed to obviate the foregoing disadvantages appertaining to the known constructions above referred to. I make a body or stem with a zigzag annular projection about it, which projection has an undercut form at certain parts of its upper zigzag side, but so as not to prevent ready clearance from the mold, and around this body or stem I place a cork facing or ring, which can be applied by forcing the stem into a cork tube or facing (hereinafter called the "cork facing") in any suitable known or convenient manner. The zigzag projection instead of being continuous may in some cases be discontinuous, so as in this case to form two or more barb-like projections.

In the accompanying drawings, Figures 1 and 2 show in side elevation and horizontal section, respectively, a stopper body or stem provided with a zigzag projection according to this invention. Fig. 3 shows in vertical section the stopper body or stem with a cork facing applied to it to form the complete stopper. Fig. 4 is a side elevation, and Fig. 5 a horizontal section, showing a modified construction of stopper body or stem. Fig. $4^a$ is a similar view to Fig. 4, showing a modified construction. Figs. 6 and 7 are elevations showing further modified constructions of stoppers according to this invention. Fig. 8 shows a stopper according to this invention in place in a bottle-neck.

Referring to Figs. 1 to 3, inclusive, 1 is a zigzag projection molded on the stem 2 of the stopper, so as to extend entirely around the stem, the projection consisting of eight inclined portions arranged to form two oppositely-arranged pairs of upwardly-pointing $\wedge$-shaped parts, over which the cork facing 3 is forced endwise. The upper side of the two opposite parts $1^a$ $1^b$ are undercut, as shown in Fig. 2, these parts, with their pointed ends $1^c$, resembling barbs, that engage both at the sides and upper ends with the cork facing and effectually prevent the latter turning upon or being withdrawn from the stem while it remains intact. The undercut sides of the parts $1^a$ $1^b$ are formed by correspondingly shaping the recesses located on each side of the dividing-line 5 of the mold 6 (shown in dotted lines in Fig. 2) and in which the stopper body or stem is made, the resulting parts $1^a$ $1^b$ being barb-like in appearance. The upper sides of the other pair of parts $1^d$ $1^e$ are not undercut.

By using a zigzag projection the sides of which are inclined alternately in opposite directions, as shown, the space between such sides and the lower surface of the head 7 of the stopper is made wedge-shaped in each direction around the stem, so that any tendency of the cork facing to revolve relatively to the stem—as, for example, when fitted very tightly into a bottle-neck and the body of the stopper is turned—would result in the cork becoming wedged in between the inclined sides and the head of the stopper in whichever direction the body of the stopper was turned. In this way rotary movement of the cork facing on the stem is effectually prevented. To obtain such a wedging action, it is not essential that the zigzag projection should be continuous. Thus it may be discontinuous, so as to form two or more inverted-V-shaped parts, that may be arranged close together, as shown in side elevation and cross-section in Figs. 4 and 5, respectively, or be displaced from each other, as shown in side elevation in Fig. 4ª and in Fig. 6, the two opposite parts 1ª 1ᵇ having undercut upper surfaces and pointed ends 1ᵈ in each case. The oppositely-inclined portions of the projection 1, Figs. 1, 2, and 3, or projections, Figs. 4, 4ª, 5, and 6, may be regarded as parts of right and left handed screw-threads.

In some cases I provide the body or stem 2, which is without any shoulder at its upper part, with a cork or other elastic ring 9—for example, a hard india-rubber ring—which is arranged next the head 7 of the stopper, as shown in Fig. 7, and below which is the cork facing 3, the ring 9 being made slightly less in diameter than the cork facing. When a stopper thus constructed is applied to a bottle-neck having an internal screw-thread 10 of slight inclination and of practically ratchet shape in cross-section, the under side of the thread being practically at right angles to the axis of the bottle, as in the example shown in Fig. 8, the upper edge of the cork facing 3 will engage with the under side of the thread, and thus enable a good grip of the stopper to be effected. In such an arrangement, which is specially suitable for bottles containing aerated liquids, the upper ring 9 and the lower portion of the cork facing 3 will tightly fit the unscrewed portions of the bottle-neck, so as to form two gas-tight joints therewith.

To facilitate turning the stopper into and out of a bottle, I provide the periphery of its head 7 with milling 11 in the form of a series of projecting partial screw-threads, which are preferably left-handed, as shown.

The body or stem of the stopper, with the projection or projections thereon, may in each case be of glass or other suitable material.

What I claim is—

1. A bottle-stopper body or stem provided on its periphery with a projection which is undercut so as to leave a vacant space between a portion of the said projection and the said body or stem and adapted to engage with an elastic or yielding facing surrounding the said body or stem, substantially as described.

2. A bottle-stopper body or stem provided on its periphery with a projection which is undercut so as to leave a vacant space between the upper surface of the said projection and the said body or stem, and a second projection on the said body or stem above the first-mentioned projection, the upper surface of the first-mentioned projection being spirally inclined to the axis of the said body or stem so as to be adapted to wedge an elastic or yielding facing, surrounding the said body or stem and engaging with the first-mentioned projection, between it and the second-mentioned projection on rotating, in one direction, the said body or stem relatively to the said facing, substantially as described.

3. A bottle-stopper body or stem provided on its periphery with a projection having its upper surface inclined spirally to the axis of the said body or stem partly in one direction and partly in the opposite direction and adapted to engage with an elastic or yielding facing surrounding the said body or stem, and a second projection on the said body or stem adapted in conjunction with the first-mentioned projection to prevent the said facing from being rotated on the said body or stem, substantially as described.

4. A bottle-stopper comprising a body or stem provided on its periphery with a projection or projections, an upper elastic or yielding facing surrounding the said body or stem, a lower elastic or yielding facing surrounding the said body or stem and engaging with the said projection or projections, the second-mentioned facing being of larger diameter than the first-mentioned facing so that its upper edge can engage with the lower surface of the internal thread of a bottle-neck, substantially as described.

In testimony whereof I have signed my name to this specification in the presence of two subscribing witnesses.

WILLIAM PRIESSNITZ BONWICK.

Witnesses:
 EDMUND S. SNEWIN,
 WM. V. BROWN.